Patented Oct. 17, 1944

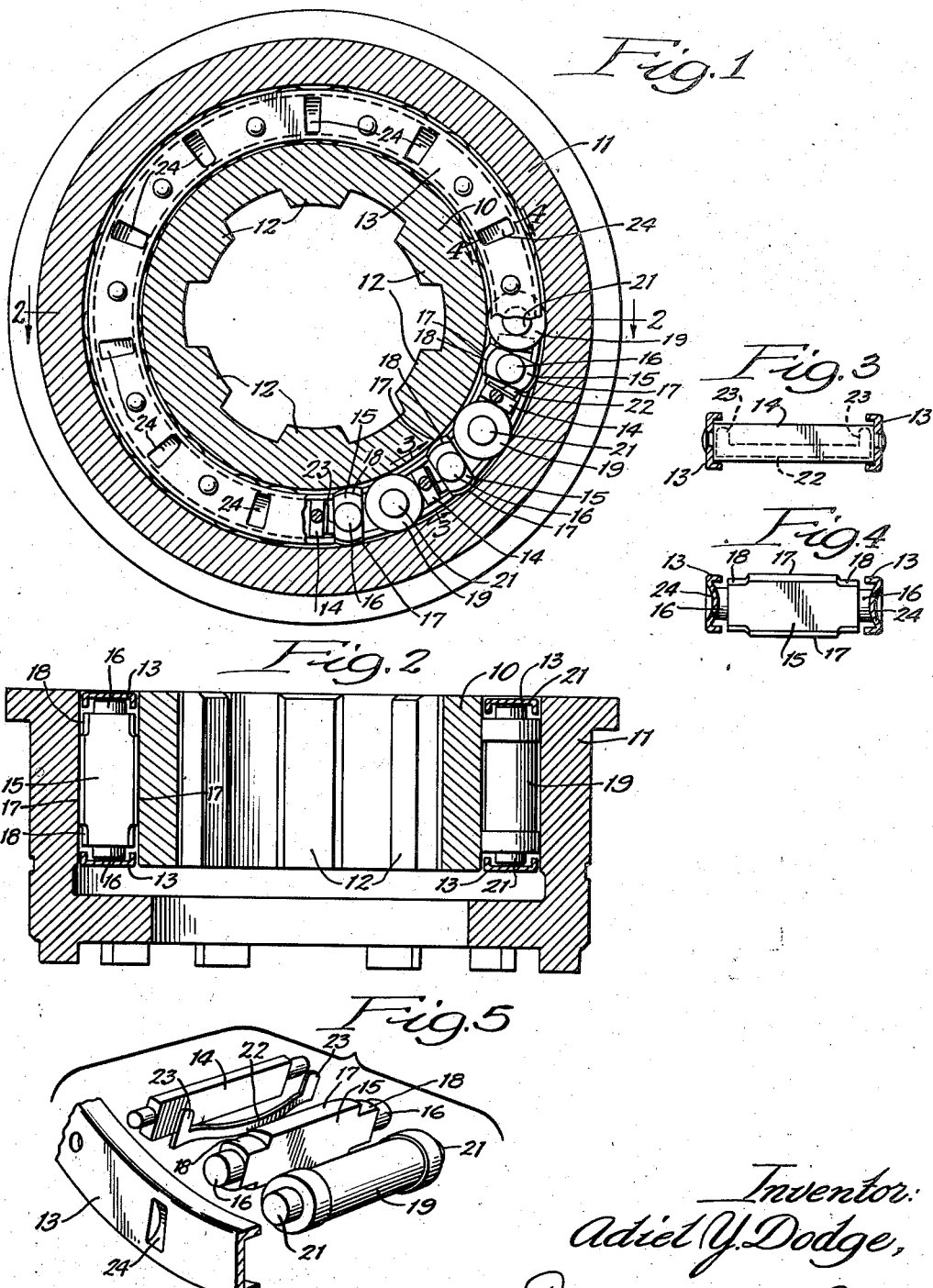

2,360,481

UNITED STATES PATENT OFFICE 2,360,481

ONE-WAY CLUTCH

Adiel Y. Dodge, Rockford, Ill.

Application November 13, 1942, Serial No. 465,420

8 Claims. (Cl. 192—45.1)

This invention relates to one-way clutches and more particularly to a construction permitting free rotation between two races in one direction and positively preventing rotation in the opposite direction.

One of the objects of the invention is to provide a one-way clutch in which sprags or grippers are securely confined in a cage which limits circumferential movement thereof without interfering with tilting or rotary movement.

Another object of the invention is to provide a one-way clutch in which each sprag is yieldingly urged to gripping position by a spring. Preferably the springs employed are curved leaf springs lying axially between the sprags and the cage and engaging the sprags at one side of their radial center to exert a tilting force thereon.

Another object of the invention is to provide a one-way clutch in which spring and bearing elements are supported side by side in a cage and relative movement thereof circumferentially of the cage is limited.

The above and other objects and advantages of the invention will be more readily apparent from the following description when read in connection with the accompanying drawing, in which—

Figure 1 is a transverse section of a one-way clutch embodying the invention;

Figure 2 is a section on the line 2—2 of Figure 1;

Figures 3 and 4 are partial sections on the lines 3—3 and 4—4 respectively of Figure 1; and Figure 5 is an exploded view of one set of elements.

The clutch illustrated is designed to connect an inner race 10 and an outer race 11 having spaced coaxial cylindrical surfaces. The inner race 10 may be formed on its interior with splines indicated at 12 for connection to a shaft and the outer race may be formed on its exterior for mounting in an element to be connected to the shaft.

A cage is mounted between the inner and outer races and as shown, comprises end rings 13 of sheet metal or the like, formed to a channel shape cross section as best seen in Figure 3. The two end rings are mounted with the open sides of their channels facing and are rigidly connected by a series of cross bars 14 of rectangular section having reduced ends adapted to pass through openings in the rings and to be riveted over, as shown. While one specific form of cage has been shown, it will be understood that the complete cage could be cast or could be assembled by welding or brazing.

The cage supports a series of sprags 15 having reduced cylindrical ends 16 fitting slidably within the channels of the rings 13 and having an eccentric central portion formed with arcuate ends 17 curved about spaced centers. The eccentric central portion is of less width than the central part of the sprag so that reduced ends 18 are left adjacent the ends of the sprag for a purpose to appear later.

The sprags are mounted side by side with bearing rollers 19, one sprag and one roller being arranged between each pair of cross bars 14. The rollers are formed with reduced cylindrical ends 21 fitting within the flanges of the rings 13 and are of reduced diameter in the central portion registering with the eccentric parts of the sprags. In this way, the enlarged ends of the rollers form an anti-friction bearing connection between the races and operate on a different surface than the eccentric parts of the sprags. At the same time, the reduced portions 18 of the sprags and the reduced central portions of the rollers provide passages for lubricant as is more particularly described and claimed in my Patent No. 2,113,722. The sprags are urged toward their gripping position and are held in place in the assembly against rattling and chatter by means of springs acting between each sprag and the adjacent cage cross bar. The springs as shown, are elongated leaf springs 21 having a central arcuate portion 22 and enlarged end portions 23. In assembled position, the enlarged end portions 23 lie against one face of a cross bar 14 and the arcuate central portion 22 presses yieldingly against the adjacent face of a sprag at a point outwardly beyond its radial center. With the sprags and springs assembled, as seen in Figure 1, it will be noted that the springs tend to tilt the sprags into gripping position.

In order to limit radial movement of the sprags and bearing rollers to prevent binding therebetween and to insure proper spacing at all times, the cage rings are formed with projections lying between the reduced cylindrical ends 16 and 21. As shown the projections are formed by pressing out the sides of the rings as at 24 to form integral lugs or ears lying between the cylindrical ends of adjacent sprags and rollers. These projections are so spaced and are of such a width as to limit the permissible circumferential movement of both the sprags and the rollers without interfering with free tilting or rotational movement thereof.

In operation when the outer race tends to turn clockwise relative to the inner race as seen in Figure 1, the sprags will be tilted clockwise so that their portion of lesser diameter is radially aligned between the races. At this time, the outer race may turn freely relative to the inner race since any tendency of the sprags to bind will result only in a further tilting thereof. When the outer race tends to turn counter-clockwise relative to the inner race, the sprags will be tilted in the opposite direction to cause the portion of a greater diameter to lie in a radial line between the races so as to bind against the race surfaces and to connect the races. Since each sprag is individually controlled by its own spring, the sprags will all operate in unison regardless of minor variations in their dimensions so that the races will be gripped together uniformly throughout their circumference. It will be further noted that the sprags and rollers are permanently secured in the cage so that the cage with the sprags and rollers assembled therein can readily be handled as a unit.

While one embodiment of the invention has been shown and described in detail, it will be understood that this is illustrative only, and is not to be taken as a definition of the scope of the invention, reference being had for this purpose to the appended claims.

What is claimed is:

1. A one-way clutch comprising inner and outer races, a cage between the races including a pair of end rings connected by rigid cross bars, a sprag between each pair of adjacent cross bars tiltable into gripping or release position, and a longitudinally curved leaf spring having enlarged end portions lying against one of the cross bars of each pair with its central portion engaging the adjacent sprag at one side of its radial center to urge it into gripping position.

2. A one-way clutch comprising inner and outer races, a cage between the races including chanlel shaped end rings connected by rigid cross bars, a sprag between each pair of cross bars having reduced ends fitting into the end rings and an eccentric central portion tiltable into gripping or release position, a spring between each sprag and one of the adjacent cross bars urging the sprag into gripping position, and means on the end rings engaging the reduced ends of the sprags to limit movement thereof around the cage under the influence of the springs.

3. A one-way clutch comprising inner and outer races, a cage between the races including channel shaped end rings connected by rigid cross bars, a sprag between each pair of cross bars having reduced ends fitting into the end rings and an eccentric central portion tiltable into gripping or release position, a bearing element between each pair of cross members beside the sprags, and a spring between each sprag and the adjacent cross member.

4. A one-way clutch comprising inner and outer races, a cage between the races including channel shaped end rings connected by rigid cross bars, a sprag between each pair of cross bars having reduced ends fitting into the end rings and an eccentric central portion tiltable into gripping or release position, a bearing element between each pair of cross members beside the sprags, a spring between each sprag and the adjacent cross member, and means carried by the cage between adjacent sprags and bearing elements to limit their movement toward each other.

5. A one-way clutch comprising inner and outer races, a cage between the races including channel shaped end rings connected by rigid cross bars, a sprag between each pair of cross bars having reduced ends fitting into the end rings and an eccentric central portion tiltable into gripping or release position, a bearing element between each pair of cross members beside the sprags, and projections on the end rings between and engaging the ends of the sprags and bearing elements to limit movement thereof toward each other.

6. A one-way clutch comprising inner and outer races, a cage between the races including channel shaped end rings connected by rigid cross bars, a sprag and a bearing roller side by side between each pair of cross bars having reduced ends fitting into and movably supported by the end rings, and a spring between each sprag and the adjacent cross bar.

7. A one-way clutch comprising inner and outer races, a cage between the races including channel shaped end rings connected by rigid cross bars, a sprag and a bearing roller side by side between each pair of cross bars having reduced ends fitting into and movably supported by the end rings, a spring between each sprag and the adjacent cross bar, and projections on the rings between the reduced ends of adjacent sprags and bearing rollers to limit their movement toward each other.

8. A one-way clutch comprising inner and outer races, a cage between the races including channel shaped end rings connected by rigid cross bars, a sprag and a bearing roller side by side between each pair of cross bars having reduced ends fitting into and movably supported by the end rings, projections on the rings between the reduced ends of adjacent sprags and bearing rollers, and a curved leaf spring between each sprag and its adjacent cross bar.

ADIEL Y. DODGE.